(12) United States Patent
Hoffmuller et al.

(10) Patent No.: US 10,046,585 B2
(45) Date of Patent: Aug. 14, 2018

(54) MICRO-OPTIC VIEWING ARRANGEMENT

(75) Inventors: Winfried Hoffmuller, Bad Tolz (DE);
Michael Rahm, Bad Tolz (DE);
Theodor Burchard, Gotting (DE);
Andreas Rauch, Ohlstadt (DE); Rudolf Seidler, Gmund (DE); Anne Bucker, Bayrischzell (DE); Armin Weingartner, Unterhaching (DE);
Bernhard Wiedner, Miesbach (DE);
Christian Fuhse, Otterfing (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 871 days.

(21) Appl. No.: 13/996,980

(22) PCT Filed: Dec. 20, 2011

(86) PCT No.: PCT/EP2011/006453
§ 371 (c)(1),
(2), (4) Date: Jun. 21, 2013

(87) PCT Pub. No.: WO2012/084211
PCT Pub. Date: Jun. 28, 2012

(65) Prior Publication Data
US 2013/0270813 A1    Oct. 17, 2013

(30) Foreign Application Priority Data
Dec. 22, 2010   (DE) .................. 10 2010 055 689

(51) Int. Cl.
*B42D 25/00* (2014.01)
*B42D 25/342* (2014.01)
(Continued)

(52) U.S. Cl.
CPC ........ *B42D 15/00* (2013.01); *B29D 11/00298* (2013.01); *B29D 11/00365* (2013.01);
(Continued)

(58) Field of Classification Search
CPC .................................................. B42D 25/342
(Continued)

(56) References Cited

U.S. PATENT DOCUMENTS 4,892,336 A    1/1990  Kaule et al.
5,800,907 A *  9/1998  Yumoto .................. B29C 41/12
                                                        264/1.32
(Continued)

FOREIGN PATENT DOCUMENTS

DE    102005062132 A1    7/2007
DE    102006029852 A1    1/2008
(Continued)

OTHER PUBLICATIONS

International Search Report in PCT/EP2011/006453, dated May 7, 2012.
(Continued)

*Primary Examiner* — Kyle R Grabowski
(74) *Attorney, Agent, or Firm* — Justin J. Cassell; Workman Nydegger (57) ABSTRACT

A micro-optical inspection arrangement comprises micro-focusing elements which are composite bodies consisting of a main part and an additional part and which have a reference focal length. The main parts are provided as micro-focusing element preforms, and the additional parts are formed from one or more functional coatings. The invention also relates to a method for producing such a micro-optical inspection arrangement and to a micro-optical displaying arrangement comprising the micro-optical inspection arrangement according to the invention and a
(Continued)

microstructure arrangement, in particular a moiré magnification arrangement and a modulo magnification arrangement. The invention also relates to security elements and data carriers that have the micro-optical inspection arrangement according to the invention.

18 Claims, 4 Drawing Sheets (51) Int. Cl.
    *B42D 15/00* (2006.01)
    *B29D 11/00* (2006.01)
    *G02B 3/00* (2006.01)
    *B42D 25/40* (2014.01)
    *B41M 1/24* (2006.01)
    *B41M 3/14* (2006.01)

(52) U.S. Cl.
    CPC ........... *B42D 25/00* (2014.10); *B42D 25/342* (2014.10); *B42D 25/40* (2014.10); *G02B 3/0031* (2013.01); *B41M 1/24* (2013.01); *B41M 3/148* (2013.01); *Y10T 29/49982* (2015.01)

(58) Field of Classification Search
    USPC ......................................................... 359/619
    See application file for complete search history.

(56) References Cited

U.S. PATENT DOCUMENTS

| | | | | |
|---|---|---|---|---|
| 6,046,855 A * | 4/2000 | Goto | ................ | B29D 11/00278 359/619 |
| 7,259,915 B2 * | 8/2007 | Kwon | .................. | G02B 3/0031 359/453 |
| 7,394,596 B1 * | 7/2008 | Chung | .................. | G03B 35/24 359/619 |
| 8,149,511 B2 | 4/2012 | Kaule et al. | | |
| 8,400,495 B2 | 3/2013 | Kaule | | |
| 8,557,369 B2 | 10/2013 | Hoffmuller et al. | | |
| 8,632,100 B2 | 1/2014 | Kaule et al. | | |
| 8,771,803 B2 | 7/2014 | Dichtl | | |
| 8,778,481 B2 | 7/2014 | Kaule et al. | | |
| 8,786,521 B2 | 7/2014 | Kaule et al. | | |
| 8,878,844 B2 | 11/2014 | Kaule et al. | | |
| 2003/0227688 A1 * | 12/2003 | Houlihan | ............. | G02B 3/0031 359/619 |
| 2004/0223071 A1 | 11/2004 | Wells et al. | | |
| 2005/0157396 A1 * | 7/2005 | Teshima | .................... | B32B 3/08 359/619 |
| 2006/0126185 A1 * | 6/2006 | Oh | ................... | B29D 11/00278 359/619 |
| 2007/0263291 A1 * | 11/2007 | Whitehead | ........... | G02B 3/0012 359/619 |
| 2008/0160226 A1 * | 7/2008 | Kaule | .................. | B42D 25/355 428/29 |
| 2009/0008923 A1 | 1/2009 | Kaule et al. | | |
| 2009/0034082 A1 * | 2/2009 | Commander | ........ | B42D 25/342 359/619 |
| 2009/0297805 A1 | 12/2009 | Dichtl | | |
| 2010/0109317 A1 | 5/2010 | Hoffmuller et al. | | |
| 2010/0177094 A1 | 7/2010 | Kaule et al. | | |
| 2010/0182221 A1 | 7/2010 | Kaule et al. | | |
| 2010/0194532 A1 | 8/2010 | Kaule | | |
| 2010/0208036 A1 | 8/2010 | Kaule | | |
| 2011/0063725 A1 * | 3/2011 | George | ............. | G02B 27/2214 359/619 |
| 2011/0116152 A1 * | 5/2011 | Guigan | .................. | B41M 3/003 359/619 |
| 2014/0175785 A1 | 6/2014 | Kaule et al. | | |

FOREIGN PATENT DOCUMENTS

| | | |
|---|---|---|
| DE | 102007007914 A1 | 8/2008 |
| DE | 102007029203 A1 | 1/2009 |
| EP | 0238043 A2 | 9/1987 |
| WO | 2006087138 A1 | 8/2006 |
| WO | 2008000350 A1 | 1/2008 |
| WO | 2009000527 A1 | 12/2008 |
| WO | 2009000528 A1 | 12/2008 |
| WO | 2009000529 A2 | 12/2008 |
| WO | 2009/147353 A2 | 12/2009 |
| WO | WO 2009147353 A2 * | 12/2009 ....... B29D 11/00365 |

OTHER PUBLICATIONS

International Preliminary Report on Patentability and Written Opinion in PCT/EP2011/006453, dated Jun. 25, 2013.
Hutley et at., "The Moiré Magnifier," Pure and Applied Optics, Journal of the European Optical Society Part A, vol. 3, No. 2, 1994, pp. 133-142.

* cited by examiner

MICRO-OPTIC VIEWING ARRANGEMENT

BACKGROUND OF THE INVENTION

The invention relates to a micro-optic viewing arrangement having a multiplicity of microfocusing elements that focus in a target focal-plane and form a viewing grid. The invention also relates to micro-optic representation arrangements that have a micro-optic viewing arrangement according to the invention, security elements for securing the authenticity of data carriers that have a micro-optic viewing arrangement according to the invention, and data carriers that have a micro-optic viewing device according to the invention. The invention furthermore relates to a method for manufacturing the micro-optic viewing arrangement and a method for manufacturing data carriers having the micro-optic viewing arrangement according to the invention.

Data carriers, such as value documents or identification documents, bank notes, deeds, checks, but also other objects of value, such as branded articles, are often provided for safeguarding purposes with security elements which permit a check of the authenticity of the data carrier and which at the same time serve as protection from unauthorized reproduction. The security elements can be configured for example in the form of a security thread embedded in a bank note, a window security thread, a cover foil for a bank note with a hole, an applied strip or a self-supporting transfer element, such as a label, which is applied after its manufacturing to the value document. For the purposes of the present invention, by a value document there are to be understood also security papers, security papers constituting a precursor to a value document not yet fit for circulation.

A special role has been played here for some time by security elements having optically variable elements which convey different pictorial impressions to the viewer from different viewing angles, because optically variable elements cannot be reproduced even with high-quality color copiers. For this purpose, the security elements can be equipped with security features in the form of optically-diffractively active microstructures or nanostructures, for example with embossed holograms or other hologram-like diffraction structures. However, such structures are more and more used also for purposes other than security applications, which is why their value as security features has gone down, because they are often rather perceived as a design feature and receive little attention.

It has also been customary for some time to use lens systems as security features. For example in the print EP 0 238 043 A2 there is described a security thread made of a transparent material having embossed on its surface a grid comprising a plurality of parallel cylindrical lenses. The thickness of the security thread is chosen such that it corresponds approximately to the focal length of the cylindrical lenses. A printed picture is applied in exact register to the opposite surface, the printed picture being designed with consideration of the optical properties of the cylindrical lenses.

A more striking variant are so-called moiré magnification arrangements. Such a moiré magnification arrangement is disclosed in the print WO 2006/087138 A1. The security element disclosed therein has at least a first and a second authenticity feature. The first authenticity feature here comprises a first arrangement with a multiplicity of focusing elements which are present in a first grid, as well as a second arrangement with a multiplicity of microscopic structures which are present in a second grid. The first and the second arrangement are arranged relative to each other such that the microscopic structures of the second arrangement are to be seen magnified upon viewing through the focusing elements of the first arrangement.

The basic mode of function of moiré magnification arrangements is described in the article "The moiré magnifier", M. C. Hutley, R. Hunt, R. F. Stevens and P. Savander, Pure Appl. Opt. 3 (1994), pp. 133 to 142. Very briefly, moiré magnification designates the phenomenon which occurs upon viewing a grid comprising identical picture objects through a lens grid with approximately the same grid dimension. As with every pair of similar grids, there results here a moiré pattern consisting of a periodic arrangement of magnified and, where applicable, rotated images of the elements of the picture grid.

Further micro-optic magnification arrangements of the moiré type are described in the applications DE 10 2007 029 203 A1 and WO 2009/000529 A2 described, and so-called modulo magnification arrangements are described in the applications WO 2009/000527 A1 and WO 2009/000528 A1. All these micro-optic magnification arrangements contain a motif picture with microstructures which reconstructs a specified target image upon viewing with a suitably coordinated viewing grid. As explained more precisely in the above-mentioned prints and applications, there can thereby be produced a multiplicity of visually attractive magnification effects and movement effects which lead to a high recognition value and a high forgery resistance of the security elements or value documents equipped therewith.

In the known moiré magnification arrangements (moiré magnifiers) the picture to be represented consists of individual motifs which are periodically arranged in a grating. The motif picture to be viewed through the lenses represents a version of the image to be represented, which version is greatly reduced in size, the area assigned to each single motif maximally corresponding approximately to a lens cell. Due to the smallness of the lens cells, only relatively simple structures come into consideration as single motifs. In contrast thereto, in "modulo mapping" the target image is in general a single image, i.e. it need not necessarily be composed of a grating of periodically repeated single motifs. The target image can represent a complex single image with high resolution. In modulo magnification arrangements, there is not necessarily involved a moiré effect, and it need not necessarily be a magnification. Rather, the term "mapping" refers to arbitrary imagings.

It is often desirable to equip micro-optic representation arrangements on their upper side, i.e. the lens side, with coatings which fulfil a given function, for example with dirt-repellent coatings and/or with adhesive layers.

In particular heavily used value documents such as bank notes are often equipped with dirt-repellent coatings so as to prolong their period of circulation. If a bank note or any other value document has a micro-optic representation arrangement, for example a moiré magnifier or a modulo mapping arrangement, it is, of course, desirable to coat also this arrangement, because it would otherwise become more soiled than the rest of the bank note.

However, micro-optic representation arrangements only provide a sharp imaging, when the microstructures to be imaged are located exactly in the focal plane of the lenses or of the any other microfocusing elements. An over-coating of the lenses, for example with a dirt-repellent coating, leads to a deterioration and in the worst case to a destruction of the optical effect, because the focal distance (focal length) of the microfocusing elements changes through the over-coating, and thus the microstructures no longer lie exactly in the focal plane of the microfocusing elements: the imaging becomes unsharp or can even completely "disappear".

A similar problem occurs upon embedding window security threads having micro-optic representation arrangements. The window security threads have on their upper side, the lens side, regions that are not covered by paper (window), and regions that are covered by paper. In the window regions a dirt-repellent coating should be advantageously provided, while in the covered regions an adhesive layer should be provided, in order to bond the thread to the paper regions resting thereon. Without bonding the paper bars lying above the thread may easily lift from the thread and can thus be quickly damaged.

It is basically possible to perform a coating of the focusing elements with adhesive in the regions of a security thread that are covered by paper bars, because the thread is not visible in these regions and a deterioration of the optical effect is therefore irrelevant. In practice, however, it is hardly possible to selectively coat with adhesive only those regions of a security threads that are later hidden under paper bars. Furthermore, it is hardly possible in practice to selectively leave out given partial regions, such as the window regions of a window security thread, when a bank note is finally equipped with a dirt-repellent coating. Therefore, one has to decide whether one does without a bonding of the window security thread to the paper bars lying above the thread and/or without equipping it with a dirt-repellent coating, or whether one accepts a deterioration of the optical quality of the thread by over-coating the lenses.

SUMMARY OF THE INVENTION

It is therefore the object of the present invention to avoid the above-stated problems of the prior art and to provide micro-optic viewing arrangements for micro-optic representation arrangements such as for example moiré magnifiers and modulo mapping arrangements, which on their upper sides are equipped with one or several functional coatings, but nevertheless provide sharp imagings of the microstructures to be imaged. Functional coatings are in particular coatings that make possible a bonding, such as coatings that guarantee a protection against soiling and/or scratching.

It is also the object of the present invention to provide micro-optic representation arrangements that have a micro-optic viewing arrangement equipped with a functional coating, security elements for securing the authenticity of data carriers that have a micro-optic viewing arrangement equipped with a functional coating, and data carriers that have a micro-optic viewing arrangement equipped with a functional coating.

It is furthermore the object of the present invention to provide a method for manufacturing a micro-optic viewing arrangement equipped with a functional coating and a method for manufacturing data carriers that have a micro-optic viewing arrangement equipped with a functional coating.

These objects are achieved by the method for manufacturing a micro-optic viewing arrangement having the features as stated in claim 1. A micro-optic viewing arrangement, a micro-optic representation arrangement, a security element, a data carrier and a method for manufacturing data carriers are stated in the independent claims. Advantageous configurations of the invention are subject matter of the dependent claims.

According to the invention, a generic method has the following steps:

manufacturing a grid-shaped arrangement of base bodies in the form of microfocusing-element preforms, and forming supplementary bodies on the base-body grid, or at least on a partial region of the base-body grid, which partial region extends over several base bodies, by coating the base-body grid with at least one coating, wherein the supplementary bodies supplement the base bodies into the microfocusing elements having the specified target focal length.

The basic idea of the present invention consists therefore in integrating the desired functional coatings into the microfocusing elements, i.e. to configure the microfocusing elements as composite bodies which have the desired functional layer as a component of the composite body. The focal point or the focal length of the microfocusing composite element results from a combination of the properties of the finished composite body, i.e. of the composite microlens in the state in which it is present on the finished data carrier fit for circulation.

In a micro-optic representation arrangement, the microfocusing elements of the micro-optic viewing arrangement must have a given focal distance (target focal length), in order to guarantee a sharp imaging of the microstructure elements to be represented. So as to avoid that functional coatings change the target focal length and thus lead to an unsharp imaging, upon the manufacturing of a micro-optic viewing arrangement according to the invention one starts out from a preform of a micro-optic viewing arrangement, i.e. from a micro-optic viewing arrangement whose microfocusing elements have a "wrong" focal length or whose elements have no focusing effect at all. The microfocusing elements are hereinafter also referred to as "microlenses".

The microlenses preforms only obtain the final form of a properly functioning microlens through the coating, i.e. they constitute base bodies which are supplemented through the coating, or also through several coatings, into a properly functioning microlens. In accordance with a special variant of the present invention, the microlenses only obtain their final form in the course of the incorporation into a value document, thereby ensuring that the functionality of a micro-optic representation arrangement as a security feature is guaranteed at the right time, namely at the time of finishing the product to be secured.

The preforms of the micro-optic viewing arrangement, i.e. grid-shaped arrangements of base bodies, in particular microlens base-bodies, can be manufactured as it is known in the prior art for micro-optic viewing arrangements, for example by means of the techniques disclosed in WO 2006/087138 A1 for micro-optic viewing arrangements, or according to the methods known from the German patent application 10 2006 029 852 A1.

The known methods for embossing into thermoplastic foils or into foils coated with radiation-curing lacquers are particularly suitable for manufacturing large areas of microlens-arrangements, or in the present case for manufacturing microlens base-bodies arrangements. For example transparent plastic foils such as PET are suitable foils, the foil thicknesses preferably being less than 50 μm, particularly preferably approximately 5 to 25 μm. A suitable microlens base body can also be manufactured using photoresist materials, as will be explained below.

The preforms of the micro-optic viewing arrangements according to the invention therefore constitute in particular grid arrangements of microlens base-bodies, whereby the microlens base-bodies need not have a lens form that is suitable for micro-optic representation arrangements, but can have such a lens form, i.e. they can be properly focusing lenses, but only with a useless focal length. All grid symmetries are suitable that are also applied for micro-optic viewing arrangements of the prior art, and also the form and dimensions of the finished composite lenses of the micro-optic viewing arrangements according to the invention correspond to the usual forms and dimensions, i.e. the finished composite lenses are for example spherical, aspherical, elliptical, or cylindrical and have diameters in the range of about 10 to 25 µm. Elongated lenses such as cylindrical lenses, of course, can have much greater dimensions in the longitudinal direction. The arrangement of the finished microlenses in the grid is as area-covering as possible, in order to guarantee a good imaging. So as to obtain a lower structure height, the finished composite lenses can also be formed by Fresnel lenses.

The microlens base-bodies can have substantially the same form as the finished microlenses, but they do not have to. For example, the base bodies can be spherical, while the finished microlenses are aspherical. The base bodies advantageously have smaller dimensions than the finished microlenses, i.e. in the grid arrangement there are grater interstices between neighboring base bodies, which are only closed in the course of the supplementing of the base bodies into the finished composite lenses.

In particular, the microlens base-bodies have not the desired target focal length. They only obtain this through the supplementary coating and the associated change of their form.

For manufacturing a micro-optic viewing arrangement according to the invention, advantageously one starts out from a grid arrangement of microlens base-bodies, whose radii of curvature, in particular at the basis (in the region in which the base bodies are connected with the carrier or merge into it), are too small for achieving the desired target focal length, and which are arranged in a grid having interstices between the base bodies that are slightly (approximately 1 to 3 µm) greater than desired for the finished microlenses. Furthermore, the base body must of course be located at the same positions in the grid at which later the finished microlenses are to be located. In particular, the base bodies must be arranged in such a way that the focal points of the later microlenses are located at the right place not only vertically but also laterally.

The coating is carried out, by the desired coating agent, for example a heat-sealable adhesive or a dirt-repellent lacquer, being applied onto the base-body grid arrangement by a suitable coating method. The application methods are not limited in any way, and in particular spraying methods, spread coating methods and printing methods, such as for example gravure printing, offset printing and flexographic printing, come into consideration.

Upon the application of the coating, this spreads not evenly, but accumulates in particular in the grid interstices. In order to avoid that the grid interstices are filled up and a more or less planar surface is obtained, which would destroy the desired optical effect, the coating agent must not be applied in too large quantities. By a suitable choice of the quantity and viscosity of the coating agent it can be achieved that the base-body grid arrangement is covered completely but unevenly. Advantageously, there accumulates significantly more coating agent in the interstices between the base bodies than on the surfaces of the base bodies. According to a preferred configuration, from a base-body lens grid there is formed a composite-body lens grid, wherein the composite-body lenses substantially reproduce the form of the base-body lenses, but also change it, wherein the change varies locally and is the stronger the closer the viewed place is located to the lens basis. At the lens edge or at the lens basis the composite-body lenses can have for example a significantly larger radius of curvature than the base-body lenses, and the edges of the composite-body lenses can have a smaller spacing to each other than the edges of the base-body lenses.

In summary, the micro-optic viewing arrangement with composite-body lenses according to the invention has the same number of lenses at the same positions as the base bodies of the base-body grid, but the composite-body lenses have a greater area coverage, are in general flattened compared to the base bodies, and focus—insofar as the base bodies already had a focusing effect—in a different focal plane than the base bodies.

The extent of the shift of the focal plane depends on several factors, in particular on the form, material, and refractive index of the base-body lenses, on the form, material, and refractive index of the supplementary coating, i.e. substantially on the material, viscosity and flow properties of the coating composition, and on the application conditions, for example the kind of application method and the temperatures. It may therefore, at first glance, seem to be extremely complex to coordinate all the factors in a suitable manner so as to obtain in the end a micro-optic viewing arrangement with appropriately focusing composite-body lenses. In fact, however, the manufacturing of desired composite-body lenses is surprisingly simple. There cannot be stated a generally valid formula which takes into account all the factors and leads to the desired focal lengths when the corresponding conditions are fulfilled, but in each individual case one must rather proceed empirically. However, it is normally possible to reach the desired result in each individual case with the aid of only few tests, by proceeding as follows:

Some parameters are fixed from the start or are variable only to a limited extent. Typically, the desired coating material is fixed, for example a polyamide (for forming an at the same time heat-sealable and dirt-repellent coating), as well as the desired raster geometry. A person skilled in the art will therefore manufacture for example a corresponding lens-base-body grid of usual materials with base-body lenses of somewhat smaller dimensions (smaller radii of curvature) than that of the desired composite-body lenses. On the basis of his technical knowledge he can at least roughly estimate, which materials and forms could be suitable. In a simple variant, for the base-body lenses there is chosen a material, whose refractive index is as similar as possible to the refractive index of the coating material. Then the coating material is dissolved, in the case of a polyamide for example in a binary solvent mixture such as ethanol/toluene, applied onto the base-body-lens grid arrangement, and after the drying there is finally determined the focal length of the obtained composite-body lenses.

If the focal length is still too short, the viscosity of the coating agent can be reduced, for example through a larger amount of solvent or in the case of solvent-free coating compositions through a rise in temperature. As a result, relatively more coating material accumulates at the lens basis and relatively less coating material at the upper side of the lens. A greater flattening is achieved, which leads to an enlargement of the focal length.

When composite-body lenses having an excessive focal length are obtained through the application of the coating, the procedure is accordingly reversed.

Additionally or alternatively, also the applied amount of coating can be varied. Very small applied amounts preferably accumulate in the interstices between the base bodies, while with increasing applied amount also the surfaces of the base bodies are covered to an overproportional extent. Of course, the applied amount must not be so large that the lens form is "smeared up". Within a certain range, one can say that less large applied amounts lead to a greater shift of the focal plane.

As a further alternative, also the form of the base bodies can be changed. With otherwise unchanged conditions (the same coating material, the same viscosity of the coating composition, the same applied amount, same application temperature, etc.), base bodies that already possess a somewhat flattened form can yield, for example, a smaller change of the focal length than nearly spherical base bodies. If a desired coating material should have the tendency to always more or less completely flow into the interstices between the base bodies instead of partially adhere to the surfaces of the base bodies, surface-modifying measures on the base bodies, before the coating is carried out, will help. Such measures are, for example, a treatment with a primer and physical pre-treatments such as corona treatment, plasma treatment, flame treatment, wherein, where applicable, special process gases such as for example hydrogen, nitrogen, carbon monoxide, carbon dioxide, or silanes can be employed.

Alternatively or additionally, the preforms or base bodies, from the start, can be manufactured to have a deliberate roughness in order for the subsequently applied coating to be better anchored. Furthermore, it is possible, for example through a modification of the preforms on submicrometer scale or through additionally embossed nanostructures on and/or between the preforms, to exert an influence on the spreading of the coating, for example through self-organization as a result of locally varying surface tension.

When the coating tends to adhere too strongly to the base bodies, instead of flow more into the interstices between the base bodies, the base bodies or given regions of the base bodies can also be equipped with a lotus structure, in order to produce difficult-to-wet surfaces. Such lotus structures reduce the contact area between the base bodies and the coating, so that the coating material practically cannot adhere to the surface of the base bodies and flows easier into the interstices.

Finally, there is also the possibility to take other materials with other refractive indices instead. But this is normally not necessary. Rather, it is in most cases sufficient to change the viscosity of the coating material or the applied amount of coating material or the form (in particular the radii of curvature) of the base bodies, in order to achieve the desired result.

According to a special embodiment of the present invention, the base-body lenses are not manufactured directly, such as by embossing into thermoplastic lacquer or UV-lacquer, but melted from base-body preforms. For this purpose, a carrier foil is coated with a positive or a negative photoresist material, covered in the regions not to be irradiated, irradiated and developed, that is to say, the irradiated regions (positive resist) or the non-irradiated regions (negative resist) are dissolved. The covering prior to the irradiation is effected such that, after the development, on the carrier there remain cylinder structures, whose positions determine the positions of the later lenses. These cylinders are subsequently melted, thereby being formed small droplets with spherical surface, which after cooling then yield spherical lenses. By electroforming also a negative form can be obtained therefrom, with which the lenses can then alternatively be embossed for example into thermoplastic lacquer.

This method for manufacturing microlens arrangements is often employed, but has some disadvantages. In order for neighboring droplets to not flow together upon melting the cylinders, the cylinders and thus the later lenses must have a certain minimum spacing. Thus, only a partial region of the total area is occupied with lenses in the end, which in micro-optic representation arrangements leads to poor contrasts of the represented pictures. The contrast to be achievable with a micro-optic representation arrangement is the better, the smaller the distances between the lenses are. The imaging properties are the best in a micro-optic viewing arrangement that has an area-covering arrangement of lenses contacting each other. Furthermore, the imaging properties of spherical lenses, as they are obtained with the above method using photoresist materials, are poorer than the imaging properties of aspherical lenses. Particularly advantageous are the imaging properties of aspherical lenses, whose local radius of curvature increases from the lens center, i.e. the vertex of the lens, towards the lens basis. In the micro-optic viewing arrangements according to the invention, in which the spaced spherical lenses serve merely as base bodies for composite-body lenses, the two disadvantages are remedied simultaneously. Through the supplementary bodies, i.e. the one or several coatings on the base bodies, the interstices are significantly diminished, in the ideal case to such an extent that the composite-body lenses directly border each other, on the one hand, and through the method of the invention aspherical composite-body lenses are produced, because the coating accumulates comparatively more at the edges of the base bodies and thus the local radius of curvature is enlarged in particular at the basis of the base-body lenses, on the other hand. Such aspherical lenses have for example the advantage that in a moiré magnification arrangement the imaging remains sharp longer at larger tilting angles.

The supplementary body, i.e. that part of the composite-body lenses, that supplements the base-body lenses into the functioning composite-body lenses having the desired target focal length, can be formed in one step or in several steps. In particular, the supplementary body can be produced by applying one single coating or by applying several coatings, whereby the coatings can have the same or different functions. For example, there can first be applied a coating onto the base-body grid arrangement, which coating contains security features such as fluorescent particles or particles with color-shift effect, or which is dyed, and onto that there can then be applied a further layer such as a protective layer or an adhesive layer. The desired imaging properties of the composite-body lens, in particular the target focal length, must be achieved through the totality of the coatings.

For improving the scratch resistance of micro-optic representation arrangements or also for increasing the refractive index of a coating, nanoparticles can be added to the coatings. For example, silicon dioxide, zinc sulphide, zinc oxide, zirconium dioxide, titanium dioxide and zinc sulphide. The particles should have a particle size of less than 100 nm, in order to avoid an unwanted light scattering.

According to a particular embodiment of the present invention, the composite-body lenses only obtain their final form, and thus their target focal length, upon the incorporation of the micro-optic representation arrangement into a value document. That is to say, a security element with a micro-optic representation arrangement according to the invention need not necessarily provide a sharp representation, but merely be configured such that in the course of the proper incorporation of the security element into a value document, and, where applicable, further treatments of the value document, the composite-body lenses are changed such that they obtain their target focal length and thus yield a sharp representation. As examples there are to be mentioned a patch to be bonded on a value document and a window security thread, which respectively have, according to the invention, micro-optic representation arrangements.

As already mentioned above, it is desirable to equip value documents, such as bank notes, with protective coatings for lengthening their period of circulation. These coatings should expediently be applied at the very end of the manufacturing process, so as to protect also the security elements of the value document. If now a patch with a micro-optic representation arrangement according to the invention is used as a security element, the composite-body lenses should only obtain their target focal length through the application of the protective coating. This means that the security element itself has a still incomplete security feature, namely a micro-optic representation arrangement that yields, due to a lacking or incomplete supplementary body of the composite-body lenses, no sharp representation.

In case of a window security thread the additional problem arises, that it not only must be protected from soiling, but also has to be bonded in certain places on the upper side of the lenses to the paper. The upper side of the security element, that is the upper side of the lenses, must thus be coated with an adhesive. Basically, there are two possibilities. One possibility consists in employing an adhesive that has exclusively adhesive properties, incorporating and bonding the window security thread into the value document, and then equipping the entire value document with a protective coating. After the application of the protective coating, the micro-optic representation arrangements visible in the window areas must provide a sharp image. Therefore, the supplementary body, consisting of adhesive and protective layer, must yield in connection with the base body composite-body lenses that provide a sharp image. In this case, the supplementary body is composed of two layers.

The other possibility consists in employing an adhesive that at the same time also possesses protective properties, that is to say, is preferably dirt-repellent. In this case, it is possible to first equip the value document with a protective coating and to then incorporate the window security thread into the value document. For such applications a heat-sealable adhesive is preferably employed. In the process of the heat sealing the adhesive melts and flows not only into the regions to be bonded, but also into the window regions, so that the adhesive coating changes its form, which in turn leads to a change of the focal length of the composite-body lenses. Accordingly, the window security thread is configured such that only through the melting of the adhesive upon heat sealing composite-body lenses are obtained that yield a sharp image. This security thread, too, is thus a security element having a micro-optic representation arrangement as a security feature, which micro-optic representation arrangement provides no sharp representation. A sharp representation is only obtained through the proper further treatment of the security element (in the present case bonding by heat sealing).

Alternatively, it is also possible to equip partial regions of a security element with different base bodies and/or different supplementary bodies, or to equip partial regions of a security element with "normal" lenses and other partial regions with composite-body lenses of the invention. In these cases it is necessary to apply the coating or coatings in register to the position of the base bodies, which is more elaborate in terms of the method, but can cause particularly interesting effects. In this way, in closely adjacent regions there can be achieved for example focusings in several different focal planes.

The micro-optic representation arrangements according to the invention can also be "laminated in", for example employed as security features for foil composite bank notes, in particular for foil composite bank notes in which a paper substrate is laminated on one side or preferably on both sides with a plastic foil. In the bank note, the micro-optic representation arrangement is then covered by a plastic foil. For laminating in, a solvent-free adhesive is e.g. applied onto the grid arrangement of the base-body lenses, and then a plastic foil is connected thereto under elevated temperature. The micro-optic representation arrangement of the employed security element thus contains in this case merely the base-body lenses. The temperature must be selected such that the adhesive melts and flows such that below the top polymer layer of the foil composite bank note there arise cavities, which are enclosed on the top by the laminating foil and at the bottom by the grid arrangement of the composite-body lenses. It is advantageous to employ lenses with as small a contact area as possible between composite-body lens and plastic foil (polymer layer).

For manufacturing the supplementary bodies of the composite-body lenses there can basically be employed arbitrary coatings, but it is, of course preferred to employ coatings which also fulfil a given function (functional coatings). The functions "dirt repellence" and "heat sealability" are particularly preferred. There are also coating systems, which are at the same time dirt-repellent and heat-sealable. The coatings can at the same time also be employed as a carrier for additional security features. For example, fluorescent substances can be added. The coatings, of course, can also be dyed.

Dirt-repellent coating systems are often based on polyacrylates or polyurethanes. Examples thereof are polyacrylates, as they are offered for example by Dianal America Inc., e.g. BR-115, and polyurethanes produced of a polyester polyol and a cross-linker on the basis of isocyanate.

Heat-sealable coatings are for example methylmethacrylate such as EX-8195 and EX-8196 (Coim S.p.A.).

Polyamides are particularly preferred. Polyamides are used as melt adhesives and are known for being difficult to overcoat. They have good dirt-repellent properties, which can be further improved by the addition of suitable additives such as for example silicones and fluorosurfactants. If a polyamide is to be employed only as an adhesive and overcoated with an additional dirt-repellent coating, however, it is preferred to apply the surface of the polyamide layer with a certain surface roughness.

In the following embodiment example it is shown, how merely by testing different doctor knives upon the application of the coating on base-body lenses there can be obtained in simple fashion functioning composite-body lenses. Three different lacquers were tested. Zapon lacquer (Roth) on the basis of nitrocellulose (very good flow properties), Dynapol L206 (Evonik) with 10% solid (a polyester resin with good adhesion properties, also usable as heat seal lacquer) and Laroflex MP45 (BASF) with 20% solid (a copolymer made of vinyl chloride and vinyl isobutyl ether, good adhesion properties, also usable as heat seal lacquer). All lacquers were respectively applied onto the same grid arrangement of base-body lenses, whereby the layer thicknesses that can be applied were 6 µm (yellow doctor knife), 12 µm (red doctor knife) and 24 µm (green doctor knife). Evaluated were the imaging properties (sharpness, contrast) of the obtained composite-body lenses. Here, "--" means poor imaging properties, "O" satisfactory imaging properties, "+" good imaging properties, and "++" very good imaging properties.

As to be seen in the table, with the base-body lenses alone there could not be obtained a good representation. Composite-body lenses with Zapon lacquer as supplementary bodies, however, led to a very good representation both at layer thicknesses of 12 μm and 24 μm. Composite-body lenses with Dynapol L206 as supplementary bodies led to a good representation in the case of layer thicknesses of 6 μm and 12 μm, and composite-body lenses with Laroflex MP45 as supplementary bodies led to a very good representation with a layer thickness of 12 μm. The above statements respectively refer to the wet-layer thicknesses.

TABLE

| Coating | Zapon lacquer (Roth) | Dynapol L206 (Evonik) 10% solid | Laroflex MP45 (BASF) 20% solid |
|---|---|---|---|
| No | -- | -- | -- |
| Yellow doctor | O | + | O |
| Red doctor | ++ | + | ++ |
| Green doctor | ++ | -- | O |

The present invention thus primarily relates to micro-optic viewing elements, whose microfocusing elements are composite bodies with an integral functional coating, the target focal length and the other imaging properties of the microfocusing elements being only achieved by the functional coating. These micro-optic viewing arrangements are combined with microstructure arrangements, therefrom resulting in a basically known manner micro-optic representation arrangements, for example moiré magnification arrangements or modulo magnification arrangements. Microstructure arrangements and their manufacturing are basically known, for example from WO 2008/000350 A1. Further methods are disclosed, inter alia, in DE 10 2007 007 914 A1.

A micro-optic representation arrangement forms, alone or in combination with one or several other security features, a security element. Security elements are applied to a value document to be secured or incorporated into a value document to be secured. Alternatively, the micro-optic representation arrangement can also be applied directly to a value document to be secured or incorporated into a value document to be secured. Apart from value documents, of course, also other objects, for example any data carriers, can be secured.

With regard to different embodiments of the micro-optic representation arrangements, in particular with regard to the grid arrangement of the focusing elements (microlenses) and the microscopic structures (micromotif elements), with regard to the geometrical shape of the microlenses and the microscopic structures, with regard to layers and layer sequences, and in particular also with regard to the achieved effects, reference is made to the prints WO 2006/087138 A1, DE 10 2006 029 852 A1 and DE 10 2005 062 132 A1, whose disclosures are incorporated in this regard into the disclosure of the present application.

The micro-optic representation arrangements preferably have thicknesses in the range of about 20 μm to 50 μm, with a carrier foil thickness in the range of 5 μm to 25 μm. The diameters of the microfocusing elements and the diameters of the microstructure elements preferably lie in the same order of magnitude and are about 10 to 30 μm, preferably about 10 to 25 μm. The grid rulings of the arrangements of microfocusing elements and microstructures preferably lie only slightly above the diameters of the microfocusing elements. The extension of elongated cylindrical lenses and elongated microstructure elements in the longitudinal direction is preferably more than 300 μm, particularly preferably more than 500 μm, and in particular more than 2 mm.

BRIEF DESCRIPTION OF THE DRAWINGS

Hereinafter, the present invention will be explained with reference to some exemplary Figures. The depicted embodiments are to be understood as strictly illustrative and by no means restrictive. For clarity's sake the Figures do not show a true-to-scale or true-to-proportion representation. In particular, the lens curvatures and distances between lenses and microstructures shown in the Figures do not indicate the lens curvatures and distances between lenses and microstructures actually present in real micro-optic representation arrangements. The same reference numbers designate the same or similar elements.

In the drawings there are shown:

FIG. 1 a schematic depiction of a bank note having a window security thread and a bonded transfer element, FIG. 2 schematically the layer construction of a micro-optic representation arrangement in cross section, FIG. 3 schematically the layer construction of a micro-optic representation arrangement with functional coating according to the prior art in cross section, FIG. 4 a depiction as in FIG. 2, depicted for the purpose of direct comparison with the initial and end product, depicted in FIG. 5 and FIG. 6, of the method according to the invention for manufacturing a micro-optic representation arrangement according to the invention, FIG. 5 schematically the construction of a micro-optic representation arrangement, only with a viewing arrangement of base-body lenses in cross section, FIG. 6 a representation arrangement of the invention with a viewing arrangement with composite-body lenses in cross section, FIG. 7A to 7C a manufacturing process of a micro-optic viewing arrangement of the invention with base-body lenses of photoresist material, wherein

DETAILED DESCRIPTION OF PREFERRED EMBODIMENTS

Figure 1:
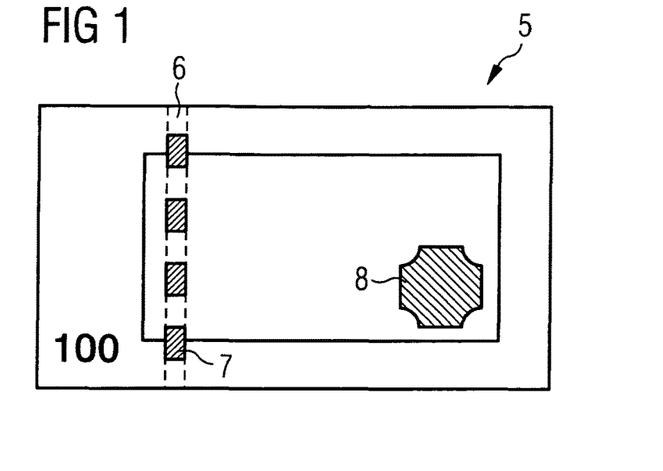

FIG. 1 shows a schematic depiction of a bank note 5 with two security elements 6 and 8, wherein the security element 6 represents a window security thread, which emerges in window regions 7 of the bank note 5, while it is embedded inside the bank note 5 in the interjacent areas. The security element 8 is a bonded transfer element of any arbitrary form.

The security element 8 can also be configured in the form of a cover foil, which is arranged above a window region or through opening of the bank note. The security element can be designed to be viewed in plan view or in transmission, or to be viewed in plan view as well as in transmission. For foil security elements that are to be attached above a through opening also such representation arrangements are very attractive in which on both sides of the microstructure arrangement lens arrangements are provided.

Both the window security thread 6 and the transfer element 8 can contain micro-optic viewing arrangements of the present invention, for example modulo magnification arrangements or moiré magnification arrangements.

Figure 2:
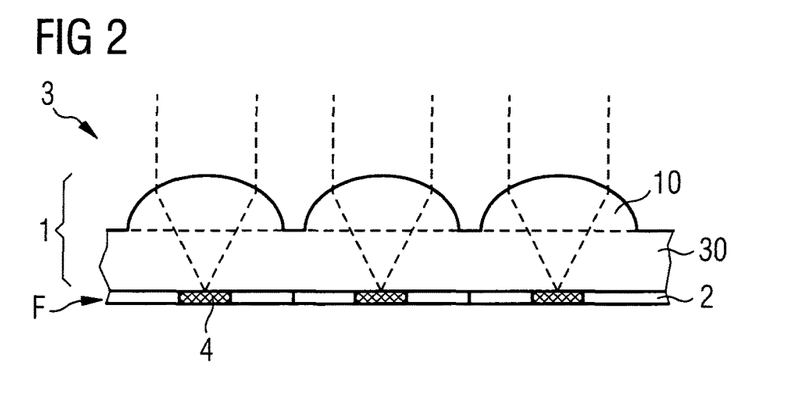

FIG. 2 schematically shows the layer construction of a micro-optic representation arrangement 3, as it can be contained in a window security thread as well as in a transfer element. Shown are only the parts of the layer construction that are required for explaining the functional principle. In the simplest case, the micro-optic representation arrangement 3 at the same time is the complete security element. The security element contains a carrier 30 in the form of a transparent plastic foil, for example a foil made of polyethylene terephthalate (PET) about 20 µm thick.

The upper side of the carrier foil 30 is provided with a grid-shaped arrangement of microlenses 10 which on the surface of the carrier foil form a two-dimensional grating with a preselected symmetry, for example a hexagonal symmetry or the symmetry of a parallelogram grating.

The spacing of neighboring microlenses 10 is preferably chosen as small as possible to guarantee as high an area coverage as possible and thus a high-contrast representation. The microlenses 10 can be for example spherical or aspherical and, with typical diameters in the range of about 5 to 50 µm, cannot be recognized with the naked eye. The microlenses 10 and the carrier 30 together form a micro-optic viewing arrangement 1 for viewing a microstructure arrangement 2.

The microstructure arrangement 2 is arranged on the lower side of the carrier foil 30 and has a motif picture having microstructure elements or motif-picture elements 4 divided into a plurality of cells, whereby the microstructure arrangement must be located in the focal plane F of the microlenses 10, in order to ensure a sharp imaging. Accordingly, the optical thickness of the carrier foil 30 and the focal distance or focal length of the microlenses 10 are mutually coordinated such that the microstructure arrangement 2 is located approximately at the distance of the lens focal distance. The carrier 30 thus forms an optical spacer layer which guarantees a desired constant spacing of the microlenses 10 and the microstructure layer or motif layer 2 having the motif picture. For achieving a magnification effect, the microstructure elements 4 respectively are located not exactly in the focal point of the microlenses 10. Rather, the grid arrangements of the microlenses 10 and the microstructure elements 4 are slightly offset relative to each other. The beam path of the light beams incident in parallel fashion on the microlenses 10 and their focusing onto the microstructure elements 4 is indicated with dashed lines.

Figure 3:
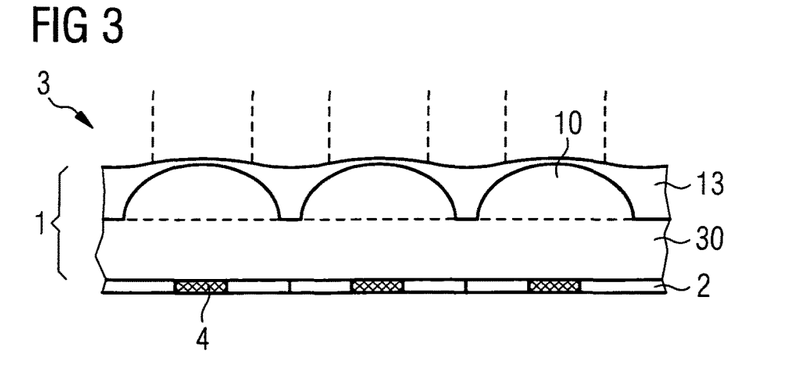

FIG. 3 shows the same micro-optic representation arrangement as FIG. 2, but with a functional layer 13, for example a heat-sealable adhesive or a dirt-repellent coating. The coating is designed as it is usual in the prior art, i.e. it forms a nearly planar surface above the microlenses 10, by it substantially completely filling up the interstices between the lenses 10. With such a coating, the focal plane of the microlenses 10 is significantly shifted, or there is no proper focusing at all, as depicted in FIG. 3. In any case, it is not possible to obtain a sharp imaging of the micromotif elements 4. In FIG. 3, this is indicated by parallel light beams being depicted with dashed lines, but no focusing beams being depicted.

Departing from the prior art, however, in the present invention the provision of a functional coating does not lead to an unsharp or hardly recognizable imaging, as the following Figures will show.

Figure 4:
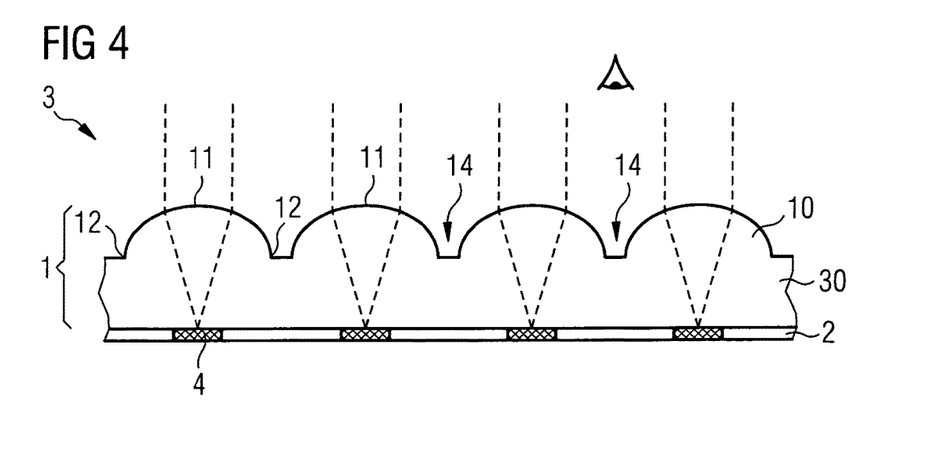

In FIG. 4 there is shown, schematically and in cross section, a micro-optic representation arrangement 3 which images micromotif elements 4. There are respectively designated only those parts of the representation arrangement 3 that are essential for explaining the method according to the invention. The viewing arrangement 1 consists of a carrier 30 and microfocusing elements (lenses) 10. The lenses 10 are arranged in a grid, and each lens has a curved surface with a vertex 11 on the top and a basis 12, i.e. a circumferential edge 12, at the bottom. "On the top" refers here to the places of the lenses which are situated closest to a viewer upon viewing the representation arrangement, and "at the bottom" refers to the places of the lenses situated the furthest remote from a viewer. Between neighboring lenses there are respectively located interstices 14, which should be as small as possible to guarantee a good imaging quality. As depicted by the dashed lines, the lenses 10 focus in a focal plane in which there is located the microstructure arrangement 2 having the microstructure elements 4. The representation arrangement 3 has no functional coating. If it would be equipped with such a coating, the focal plane of the lenses 10 would be shifted and no longer lie in the plane of the microstructure arrangement 2, with the result that the microstructure elements 4 would no longer be imaged sharply. According to the invention, there is now manufactured a micro-optic representation arrangement as in FIG. 4, the lenses 10 being coated, however, with a functional coating.

Figure 5:
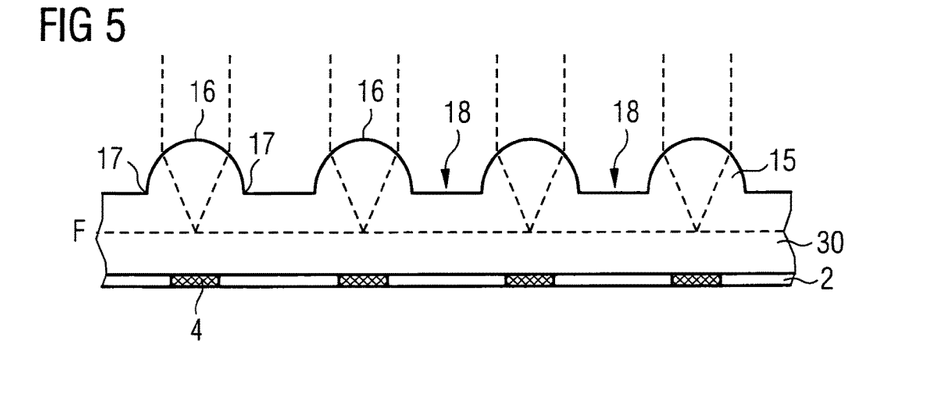

For manufacturing the representation arrangement according to the invention, one starts out from a grid-shaped arrangement of microfocusing-elements preforms, as they are depicted for example in FIG. 5. For a better illustration of the preform's focusing properties present in the embodiment example, there is also depicted the microstructure arrangement 2 with the microstructure elements 4 to be imaged, but it is, of course, also possible to first manufacture merely a viewing device 1 and to then later combine this with a microstructure arrangement 2 into the representation arrangement 3. The grid arrangement of the preforms 15 is the same as the grid arrangement of the later lenses 10, i.e. the grid has the same symmetry, and the preforms 15 are located at the same positions as the later lenses 10. The preforms 15, however, significantly differ from the lenses 10 with respect to their local radii of curvature, i.e. in the shown embodiment example they are substantially spherical with small, approximately identical radii of curvature at the vertex 16 and at the basis 17. Furthermore, the interstices 18 between neighboring preforms are significantly larger than the interstices 14 between the microlenses 10. The preforms 15 have focal points that lie in a focal plane F (indicated with dashed lines), the focal plane F not lying in the plane of the microstructure arrangement 2. Rather, the focal distances of the lens preforms 15 are significantly shorter than the focal distances of the lenses 10, which is why the microstructure elements 4 cannot be clearly imaged. Alternatively, the preforms can also be formed by elements that do not have a focusing effect.

Figure 6:
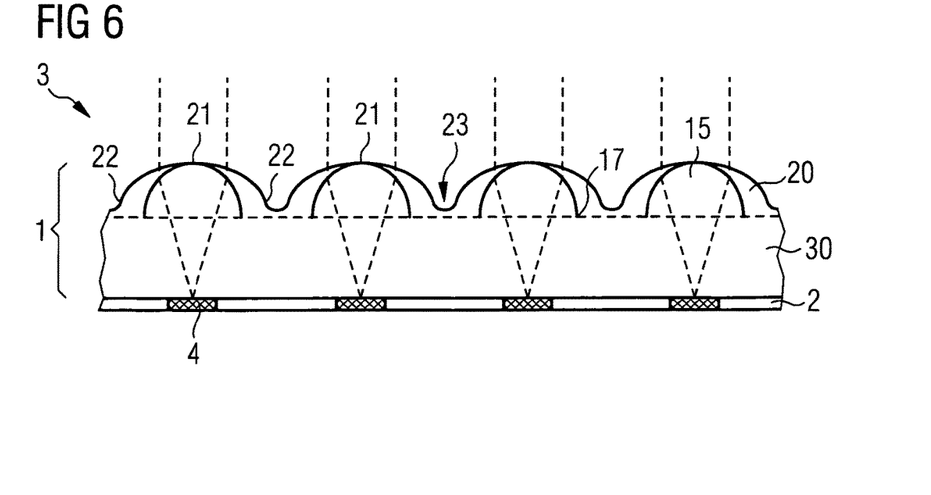

An arrangement as it is shown in FIG. 5, according to the invention serves as an initial product for manufacturing a sharply focusing representation arrangement with functional coating, as it is depicted in FIG. 6. It is evident that the representation arrangement 3 illustrated in FIG. 6 insofar corresponds to the arrangement of FIG. 5 as it also possesses lens preforms 15 on a carrier 30 and a microstructure arrangement 2 with microstructure elements 4. In the representation arrangement of the invention, however, the lens preforms 15 only constitute base bodies that serve as construction aid for manufacturing the actual lenses.

For manufacturing the actual lenses, a functional coating, for example a dirt-repellent coating or an adhesive layer, is applied onto the grid arrangement of the base bodies 15 and, depending on the type of the coating, for example UV-cured or simply dried, supported, where applicable, by heating. The coating supplements the base body 15 into finished lenses 10, i.e. it forms lens supplementary-bodies 20. The form of the supplementary bodies 20 is dependent on the type and viscosity of the coating material and, where applicable, on the application conditions. For example, a rise in temperature upon the application typically leads to a decrease of the viscosity of the coating material. In the embodiment illustrated in FIG. 6, a coating material of comparatively low viscosity was employed. The coating material has flown to a very large extent into the interstices 18 between the base bodies 15, while at the vertices 16 of the preforms 15 there is almost no coating material. To the composite lenses formed from the base bodies 15 and the supplementary bodies 20 there can be allocated a larger radius of curvature than to the base bodies 15. The composite lenses are thus, compared to the base bodies, significantly flattened, which leads to a significantly longer focal distance, compared to the base forms 15. The composite lenses now focus in the plane of the microstructure arrangement 2 having the microstructure elements 4. Furthermore, by the partial filling of the interstices 18 between the base bodies 15 through the supplementary bodies 20, the interstices 23 between neighboring composite lenses are relatively small, i.e. the grid arrangement of the composite lenses has a good area-coverage. Therefore, the viewing arrangement 1 with the composite lenses leads to a sharp and high-contrast imaging of the microstructure elements 4.

Figure 7A:
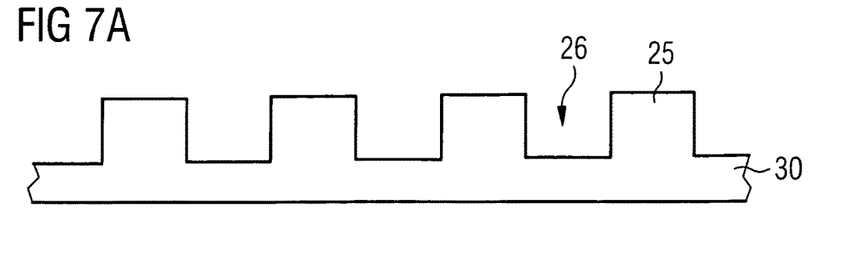
FIG. 7A shows a grid arrangement of base-body-lens preforms in cross section, FIG. 7B a grid arrangement of base-body lenses in cross section, and FIG. 7C a grid arrangement of composite-body lenses in cross section, FIG. 7D the grid arrangement of FIG. 7C in a plan view, FIG. 8 a value document with micro-optic representation arrangement of the invention and laminated plastic foil in cross section, FIG. 9 a value document with a window security thread with micro-optic representation arrangement of the invention in cross section, and FIG. 10 a micro-optic representation arrangement of the invention with two microstructure arrangements and accordingly focusing composite-body lenses in cross-section.
Figure 7B:
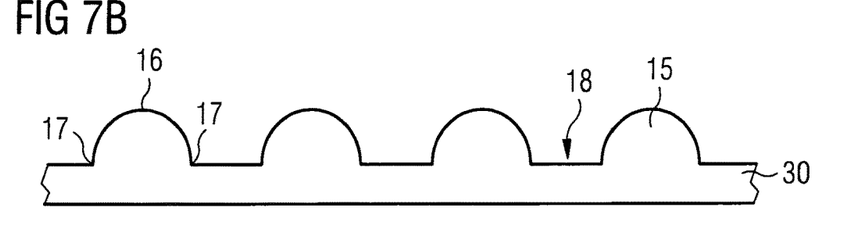

For manufacturing lens structures for micro-optic viewing arrangements, also such methods are widely spread in which at first cylinder structures are manufactured from a photoresist material, and these cylinder structures are subsequently melted. The manufacturing of the cylinder structures is effected in per se known manner by a suitably structured covering of a photoresist material on a carrier, exposing and developing, after the developing there remaining cylinder structures. Such an arrangement is depicted in FIG. 7A. The cylinder structures 25 are arranged on a carrier in a grid arrangement, respectively with interstices 26 between neighboring cylinder structures 25. The grid symmetry and the positions of the cylinder structures 25 in the grid correspond to the grid symmetry of the composite-body lens grid to be manufactured or to the positions of the composite-body lenses, which are to be manufactured, in the composite-body lens grid. Through melting the cylinder structures 25, small droplets with spherical surface are formed, which after cooling yield spherical lenses. In this way, there is formed a grid of base-body lenses 15, as it is depicted in FIG. 7B. Such a grid of base-body lenses 15 can also be produced in that the base-body lens grid manufactured according to the above method is electroformed and with the embossing master obtained therefrom corresponding base-body lenses are embossed for example into thermoplastic lacquer.

This grid of base-body lenses corresponds to the grid depicted in FIG. 5, as it can be obtained for example by embossing into thermoplastic or radiation-curing lacquer. Since the base bodies 15 at the basis 17 have a larger diameter than their preforms, the cylinders 25, the interstices 18 between the base bodies 15 are smaller than the interstices 26 between the cylinders 25. This has to be taken into account upon the manufacturing of the cylindrical base-body preforms 25. Nevertheless, the interstices 18 must be relatively large in order to prevent a flowing together of the droplets of molten resist material, and furthermore, in this way, only spherical lenses can be obtained. The relatively large interstices as well as the spherical shape of the lenses are disadvantageous, because these lead to imagings that are less sharp and poorer in contrast than grid arrangements with high area-coverage and with aspherical lenses. Here, the present invention provides the possibility to not only adjust the focal lengths of the lenses, but also to improve their imaging properties in targeted fashion. This is shown by a direct comparison of the FIGS. 7B and 7C.

Figure 7C:
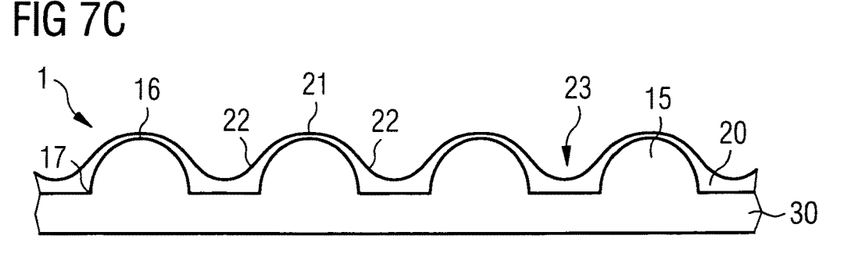

The viewing arrangement 1 depicted in FIG. 7C shows the grid arrangement of the base bodies 15 of FIG. 7B after the coating with a functional coating, i.e. after the manufacturing of the supplementary bodies 20. The interstices between neighboring composite-body lenses as well as their radii of curvature are now determined by the interstices between the supplementary bodies and the radii of curvature of the supplementary bodies. The interstices 23 between neighboring supplementary bodies (and thus between neighboring composite-body lenses) are significantly smaller than the interstices 18 between neighboring base bodies 15, and the radii of curvature at the vertices 21 of the supplementary bodies were only slightly enlarged compared to the radii of curvature at the vertices 16 of the base bodies, whereas the radii of curvature at the basis 22 of the supplementary bodies (and thus the composite-body lenses) were greatly enlarged compared to the radii of curvature at the basis 17 of the base bodies. The composite-body lenses therefore have an advantageous aspherical shape.

Figure 7D:
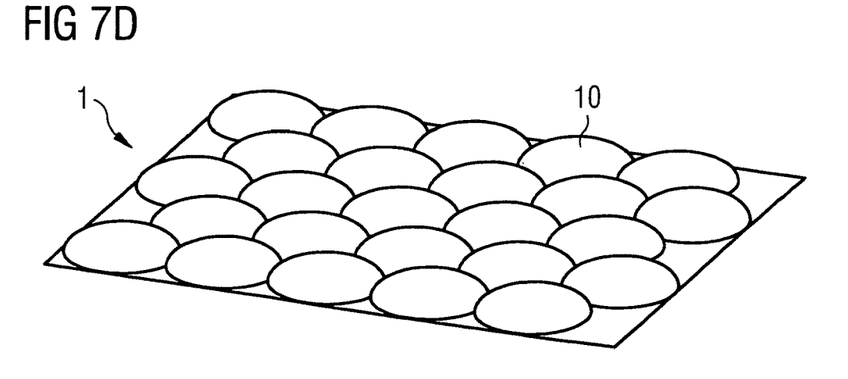

FIG. 7D shows the viewing arrangement 1 depicted in FIG. 7C in a plan view. As to be seen, there are hardly any interstices between the composite-body lenses 10, which leads to very good imaging properties of the viewing arrangement 1.

In the FIGS. 6 and 7C there are respectively depicted base bodies 15 with identical dimensions. Furthermore, there are depicted supplementary bodies 20 which extend over the entire grid arrangement and consist of only a single layer. It is also possible, however, to employ grid arrangements with differently designed base bodies, and to construct supplementary bodies from two or more layers. These layers can be identical or different and extend over the entire arrangement or respectively only over partial regions of the arrangement. Likewise, it is possible to manufacture only a partial region of a viewing arrangement in the way according to the invention, and to equip a different partial region from the start with lenses of the correct focal length. In terms of the method, it is easier, and therefore preferred, to equip a viewing arrangement over its entire area with identical base bodies 15, and to perform the coatings over the full area, too.

Figure 8:
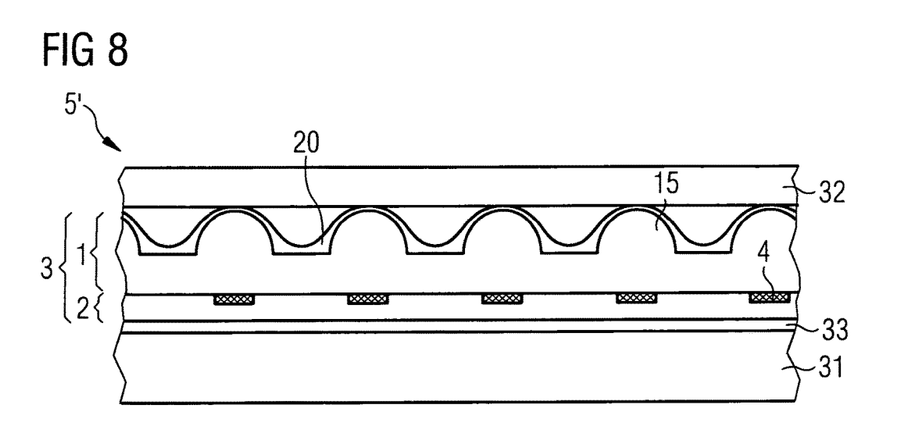

FIG. 8 shows a bank note 5' with a representation arrangement 3 according to the invention in cross section. The representation arrangement 3 consists of the viewing arrangement 1 with composite-body lenses made of base bodies 15 and supplementary bodies 20, and the microstructure arrangement 2 with microstructure elements 4. The representation arrangement 3 is bonded by means of an adhesive layer 33 to a carrier layer 31 made of paper. The supplementary bodies 20 are formed in this case by a heat-sealable adhesive layer with the aid of which a plastic laminating foil 32 is laminated on. Before the plastic foil is laminated on, the composite-body lenses do not yet focus in the plane of the microstructure elements 4. The composite-body lenses only obtain their correct form having the desired target focal length through the melting and flowing of the adhesive upon the lamination of the plastic foil 32, followed by the solidification of the adhesive layer into the supplementary body 20.

Figure 9:
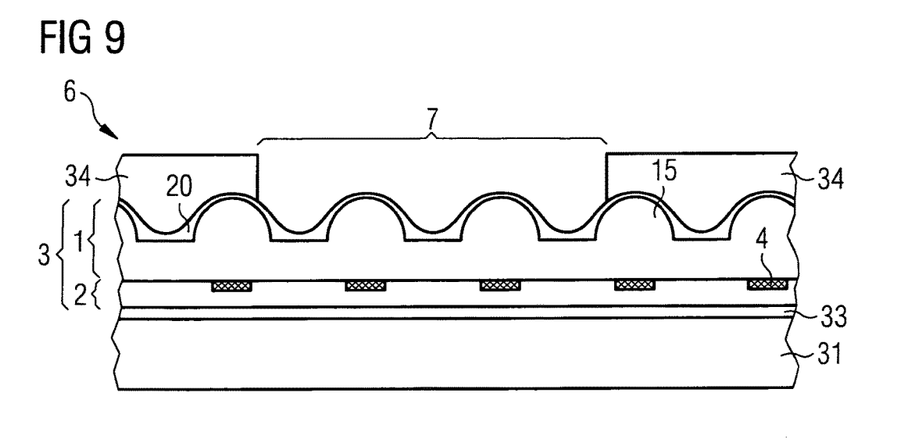

FIG. 9 shows a window security thread 6 incorporated into a bank note. The security thread of the shown embodiment consists of merely the representation arrangement 3. This representation arrangement is bonded by means of the adhesive layer 33 to the bank note paper 31. On the upper side of the representation arrangement 3, i.e. on the side of the lenses, the security thread is partly covered by window bars 34, and partly it is visible in window areas 7. In the depicted embodiment, the composite-body lenses have supplementary bodies 20 made of a functional coating that has dirt-repellent as well as bonding properties, for example made of a polyamide. Before the incorporation into the bank note, the microlenses do not yet focus in the plane of the microstructure elements 4, they thus provide no sharp representation. Only through the rise in temperature upon the bonding to the window bars 34, the supplementary bodies 20 obtain their final form, and thus the composite-body lenses their final focal length. They then provide a sharp imaging of the microstructure elements 4.

Figure 10:
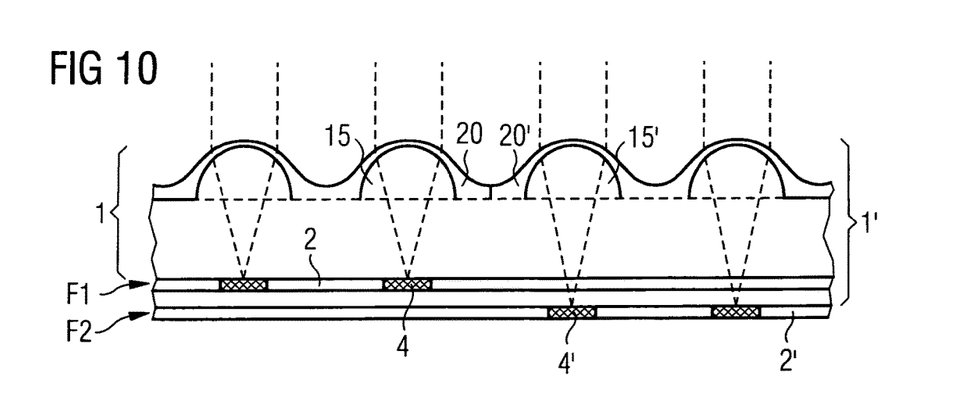

FIG. 10 shows a representation arrangement with two microstructure arrangements 2, 2'. The microstructure arrangements 2, 2' have microstructure elements 4, 4', and the sharp imaging thereof requires microlenses with different focal lengths. According to the invention, on a carrier material there can be simultaneously formed two different viewing arrangements 1, 1' with lenses that focus in a focal plane F1 and with lenses that focus in a focal plane F2 by starting out from different base bodies 15, 15' and/or forming different supplementary bodies 20, 20'. In the depicted embodiment, the composite-body lenses of the viewing arrangement 1 focus in the plane of the microstructure arrangement 2, and the composite-body lenses of the viewing arrangement 1' focus in the plane of the microstructure arrangement 2'.

The invention claimed is:

1. A method for manufacturing a micro-optic viewing arrangement having a plurality of microfocusing elements that each comprise a base body and a supplementary body, have a specified target focal length and are arranged in a viewing grid, comprising the following steps:
   manufacturing a base-body grid comprising a grid-shaped arrangement of base bodies in the form of microfocusing-element preforms and interstices between neighboring base bodies, and
   forming supplementary bodies on the base-body grid, or at least on a partial region of the base-body grid, which partial region extends over several base bodies, by coating the base-body grid or the partial region of the base-body grid with at least one coating, wherein the supplementary bodies supplement the base bodies into the microfocusing elements having the specified target focal length,
   wherein the supplementary bodies cover the base-body grid or the partial region of the base-body grid completely or substantially completely,
   wherein each of the base bodies has a curved surface with a vertex on a top and a basis at a bottom, wherein all points on the curved surface are assigned local radii of curvature that can be identical or different, and the at least one coating supplements the base bodies such that the microfocusing elements have, at least in a region of the vertex, larger local radii of curvature than the base bodies,
   wherein the at least one coating is an adhesive coating and/or a protective coating, and wherein the formation of the supplementary bodies is effected by applying at least two coatings, which can be identical or different, wherein the at least two coatings are applied onto identical or different regions of the base-body grid.

2. The method according to claim 1, wherein the base bodies have a focusing effect and are present with a focal length that differs from the specified target focal length.

3. The method according to claim 1, wherein for the formation of the supplementary bodies, at least one of the at least one coating is deformed, thereby the microfocusing elements obtaining the specified target focal length.

4. The method according to claim 1, wherein the manufacturing of the base-body grid further comprises
   embossing the base bodies into a thermoplastic foil or into a foil coated with a radiation-curing lacquer with following irradiation, or
   producing cylindrical base-body preforms of a photoresist material and subsequently melting the cylindrical base-body preforms into spherical base bodies.

5. The method according to claim 1, wherein the at least one coating is a dirt repellent coating.

6. The method according to claim 1, wherein the at least one coating is a heat-sealable coating.

7. The method according to claim 1, wherein the at least one coating includes fluorescent substances.

8. The method according to claim 1, wherein the at least one coating is both a dirt repellent coating and a heat-sealable coating.

9. A micro-optic viewing arrangement comprising a plurality of microfocusing elements that have a specified target focal length and form a viewing grid, wherein the plurality of microfocusing elements have base bodies and supplementary bodies, wherein
   the base bodies are microfocusing-element preforms, which are arranged in a base-body grid, and
   the supplementary bodies comprise at least one coating of the base-body grid or of at least a partial region of the base-body grid, which partial region extends over several base bodies and interstices between neighboring base bodies, which supplementary bodies supplement the base bodies into the plurality of microfocusing elements having the specified target focal length, and
   wherein the supplementary bodies cover the base-body grid or the partial region of the base-body grid completely or substantially completely,
   wherein each base body has a curved surface with a vertex on a top and a basis at a bottom, wherein all points on the curved surface are assigned local radii of curvature that can be identical or different, wherein the base bodies are arranged in the base-body grid with the interstices between neighboring base bodies, and the at least one coating supplements the base bodies such that the plurality of microfocusing elements have, at least in a region of the vertex, larger local radii of curvature than the base bodies,
   wherein the at least one coating is an adhesive coating and/or a protective coating, and wherein the formation of the supplementary bodies is effected by applying at least two coatings, which can be identical or different, wherein the at least two coatings are applied onto identical or different regions of the base-body grid.

10. The micro-optic viewing arrangement according to claim 9, wherein the base bodies have a focusing effect and are present with a focal length that differs from the specified target focal length.

11. The micro-optic viewing arrangement according to claim 9, wherein the at least one coating is a functional coating.

12. The micro-optic viewing arrangement according to claim 9, wherein the micro-optic viewing arrangement has at least two different microfocusing elements, which differ in that they have different base bodies and/or different supplementary bodies.

13. A micro-optic representation arrangement comprising the micro-optic viewing arrangement of claim 9, a microstructure arrangement having a plurality of microstructure elements that form a microstructure grid, wherein the microstructure arrangement can be viewed through the micro-optic viewing arrangement.

14. The micro-optic representation arrangement according to claim 13, wherein the micro-optic representation arrangement comprises a moire magnification arrangement or a modulo magnification arrangement.

15. A security element for securing the authenticity of a data carrier, comprising the micro-optic viewing arrangement according to claim 9.

16. A method for manufacturing a data carrier, wherein the data carrier comprises the security element according to claim 15, and the supplementary bodies are completed by application of at least one coating onto the data carrier, or the supplementary bodies are deformed in order to produce the specified target focal length of the plurality of microfocusing elements.

17. A data carrier, comprising the micro-optic viewing arrangement according to claim 9.

18. A micro-optic viewing arrangement comprising a plurality of microfocusing elements that have a specified target focal length and form a viewing grid, wherein the plurality of microfocusing elements have base bodies and supplementary bodies, wherein the base bodies are microfocusing-element preforms, which are arranged in a base-body grid, and the supplementary bodies comprise at least one coating of the base-body grid or of at least a partial region of the base-body grid, which partial region extends over several base bodies and interstices between neighboring base bodies, which supplementary bodies supplement the base bodies into the plurality of microfocusing elements having the specified target focal length, and wherein the supplementary bodies cover the base-body grid or the partial region of the base-body grid completely or substantially completely, and wherein the supplementary bodies are constructed of at least two coatings, wherein the at least two coatings can be identical or different and are distributed on the base-body grid in similar or different fashion.

* * * * *